US012030813B2

(12) United States Patent
Esnault et al.

(10) Patent No.: US 12,030,813 B2
(45) Date of Patent: Jul. 9, 2024

(54) ONLINE CONTROL OF RHEOLOGY OF BUILDING MATERIAL FOR 3D PRINTING

(71) Applicant: HOLCIM TECHNOLOGY LTD, Jona (CH)

(72) Inventors: Vivien Esnault, Saint-Quentin-Fallavier (FR); Pierre-Henri Jezequel, Saint-Quentin-Fallavier (FR); Fabrice Toussaint, Saint-Quentin-Fallavier (FR); Abdellaziz Labyad, Saint-Quentin-Fallavier (FR)

(73) Assignee: HOLCIM TECHNOLOGY LTD, Zug (CH)

( * ) Notice: Subject to any disclaimer, the term of this patent is extended or adjusted under 35 U.S.C. 154(b) by 1012 days.

(21) Appl. No.: 16/311,862

(22) PCT Filed: Jun. 2, 2017

(86) PCT No.: PCT/IB2017/000672
§ 371 (c)(1),
(2) Date: Dec. 20, 2018

(87) PCT Pub. No.: WO2017/221058
PCT Pub. Date: Dec. 28, 2017

(65) Prior Publication Data
US 2019/0194072 A1   Jun. 27, 2019

(30) Foreign Application Priority Data
Jun. 22, 2016  (EP) .................................... 16290112

(51) Int. Cl.
C04B 28/02 (2006.01)
B28B 1/00 (2006.01)
(Continued)

(52) U.S. Cl.
CPC .............. C04B 28/02 (2013.01); B28B 1/001 (2013.01); B28B 3/20 (2013.01); B29C 64/106 (2017.08);
(Continued)

(58) Field of Classification Search
CPC ......... C04B 28/02; C04B 2111/00181; B33Y 10/00
See application file for complete search history.

(56) References Cited

U.S. PATENT DOCUMENTS 5,549,859 A     8/1996  Andersen et al.
5,580,409 A  * 12/1996  Andersen ................ B29C 51/10
                                                   264/133
(Continued)

FOREIGN PATENT DOCUMENTS

CN     104310918 A    1/2015
CN     204354263 U    5/2015
(Continued)

OTHER PUBLICATIONS

PCA. Ultra-High Performance Concrete (Year: 2017).*
(Continued)

Primary Examiner — Farah Taufiq
(74) Attorney, Agent, or Firm — Pillsbury Winthrop Shaw Pittman LLP

(57) ABSTRACT

A method of placing a flowable construction material including a hydraulic binder for building structural components layer-by-layer, such as for 3D concrete printing, the method including preparing a fresh flowable construction material made of Portland cement, fine limestone filler materials, fine sands, water, and water reducing admixture and possibly a set or hardening accelerating admixture, conveying the flowable construction material to a deposition head, placing the construction material through an outlet of the deposition head in order to form a layer of construction material, before (Continued)

placing the construction material, adding a rheology-modifying agent to the construction material so that the placed material has an increased yield stress when compared to the material during the conveying step.

22 Claims, 1 Drawing Sheet

(51) Int. Cl.
| | |
|---|---|
| B28B 3/20 | (2006.01) |
| B29C 64/106 | (2017.01) |
| B33Y 10/00 | (2015.01) |
| B33Y 70/10 | (2020.01) |
| C04B 14/04 | (2006.01) |
| C04B 22/06 | (2006.01) |
| C04B 22/08 | (2006.01) |
| C04B 22/12 | (2006.01) |
| C04B 22/14 | (2006.01) |
| C04B 24/16 | (2006.01) |
| C04B 24/26 | (2006.01) |
| C04B 24/32 | (2006.01) |
| C04B 24/34 | (2006.01) |
| C04B 24/38 | (2006.01) |
| C04B 40/00 | (2006.01) |
| E04G 21/04 | (2006.01) |
| C04B 103/00 | (2006.01) |
| C04B 103/12 | (2006.01) |
| C04B 103/30 | (2006.01) |
| C04B 103/32 | (2006.01) |
| C04B 103/44 | (2006.01) |
| C04B 111/00 | (2006.01) |

(52) U.S. Cl.
CPC .............. *B33Y 10/00* (2014.12); *B33Y 70/10* (2020.01); *C04B 14/045* (2013.01); *C04B 22/06* (2013.01); *C04B 22/085* (2013.01); *C04B 22/124* (2013.01); *C04B 22/148* (2013.01); *C04B 24/16* (2013.01); *C04B 24/2652* (2013.01); *C04B 24/32* (2013.01); *C04B 24/34* (2013.01); *C04B 24/38* (2013.01); *C04B 24/383* (2013.01); *C04B 40/0028* (2013.01); *E04G 21/04* (2013.01); *C04B 2103/0079* (2013.01); *C04B 2103/12* (2013.01); *C04B 2103/302* (2013.01); *C04B 2103/32* (2013.01); *C04B 2103/44* (2013.01); *C04B 2111/00181* (2013.01)

(56) References Cited

U.S. PATENT DOCUMENTS

| | | | |
|---|---|---|---|
| 5,803,665 | A | 9/1998 | Stephens et al. |
| 2011/0320040 | A1 | 12/2011 | Koehler et al. |
| 2013/0102705 | A1 | 4/2013 | Sabio et al. |
| 2015/0005414 | A1 | 1/2015 | Guise et al. |
| 2015/0072068 | A1 | 3/2015 | Bowers et al. |
| 2015/0266783 | A1* | 9/2015 | Ciuperca ............. C04B 40/0082 165/61 |
| 2015/0329422 | A1* | 11/2015 | Grelaud ............. C04B 28/04 106/695 |
| 2016/0107332 | A1* | 4/2016 | Grivetti ............. B28B 3/2636 425/375 |
| 2016/0107396 | A1* | 4/2016 | Berman ............. B05D 1/02 425/510 |
| 2016/0244366 | A1* | 8/2016 | Turcinskas ............. C04B 28/006 |

FOREIGN PATENT DOCUMENTS

| | | |
|---|---|---|
| CN | 104891891 A | 9/2015 |
| CN | 104961411 A | 10/2015 |
| CN | 105384416 A | 3/2016 |
| EP | 0 120 812 B1 | 2/1989 |
| EP | 0 577 604 A1 | 1/1994 |
| FR | 1 178 272 A1 | 5/1959 |
| FR | 2 961 807 A1 | 12/2011 |
| KR | 10-2015-0138608 A1 | 12/2015 |
| KR | 10-1620074 B1 | 5/2016 |
| RU | 2585703 C2 | 6/2016 |
| WO | WO 92/11982 A1 | 7/1992 |
| WO | WO1994019172 A1 * | 9/1994 |
| WO | WO 95/33606 A1 | 12/1995 |
| WO | WO 2013/064826 A1 | 5/2013 |

OTHER PUBLICATIONS

International Search Report as issued in International Patent Application No. PCT/IB2017/000672, dated Aug. 22, 2017.
First Office Action as issued in Chinese Patent Application No. 201780038820.1, dated Mar. 22, 2021.
Office Action as issued in Russian Patent Application No. 2019100803, dated May 29, 2020.
European Opposition as filed against European Application No. 16290112.8, dated Feb. 21, 2022.
Perrot, A. et al., "Structural built-up of cement-based materials used for 3D-printing extrusion techniques," Materials and Structures (2016), 49: 1213-1220.
Boulekbache, B. et al., "Influence of yield stress and compressive strength on direct shear behaviour of steel fibre-reinforced concrete," Construction and Building Materials, Elsevier, Netherlands, vol. 27, No. 1, DOI: 10.1016/J.CONBUILDMAT.2011.07.015, ISSN: 0950-0618, (Jul. 18, 2011), pp. 6-14 (Aug. 17, 2011), XP028102037, (Feb. 2012).
Le, T. T., et al., "Mix Design and Fresh Properties for High-Performance Printing Concrete," Materials and Structures, vol. 45, (2012), pp. 1221-1232; https://doi.org/10.1617/s11527-012-9828-z (Nov. 15, 2012).
Malaeb, Z. et al.; "3D Concrete Printing: Machine and Mix Design"; International Journal of Civil Engineering and Technology 6(6):14-22, Jun. 2015; DOI: https://www.researchgate.net/publication/280488795_3D_Concrete_Printing_MachMac_and_Mix_Design, (Jun. 2015).
Nerela, V. N. et. al., "Studying printability of fresh concrete for formwork free Concrete on-site 3D Printing technology (CONPrint3D)," Conference Paper, Mar. 2016; DOI: https://www.researchgate.net/publication/296817129_Studying_printability_of_fresf_concrete_for_formwork_free_Concrete_onsite_3D Printing technology_CONPriCO3D, (Mar. 2016).
Lim, S. et al., "Fabricating construction components using layer manufacturing technology," Proc Int Cont Glob Innov Constr. 512-520.; DOI: https://www.researchgate.net/publication/312919469_Fabricating_construction_components_using_layer_manufacturing_technology, (Jan. 2009).
Valkenaers, H. et al., "Additive manufacturing for concrete: a 3D printing principle," euspen International Conference, Date: Jun. 2, 2014-Jun. 6, 2014, Proceedings of the 14th euspen International Conference; (2014), vol. 1; pp. 139-142; DOI: https://limo.libis.be/primoexplore/fulldisplay?docid=LIRIAS1461285&context=L&vid=Lirias&search_scope=Lirias&tab=default_tab&lang=en_US&fromSitemap=1 (Jun. 2014).

* cited by examiner

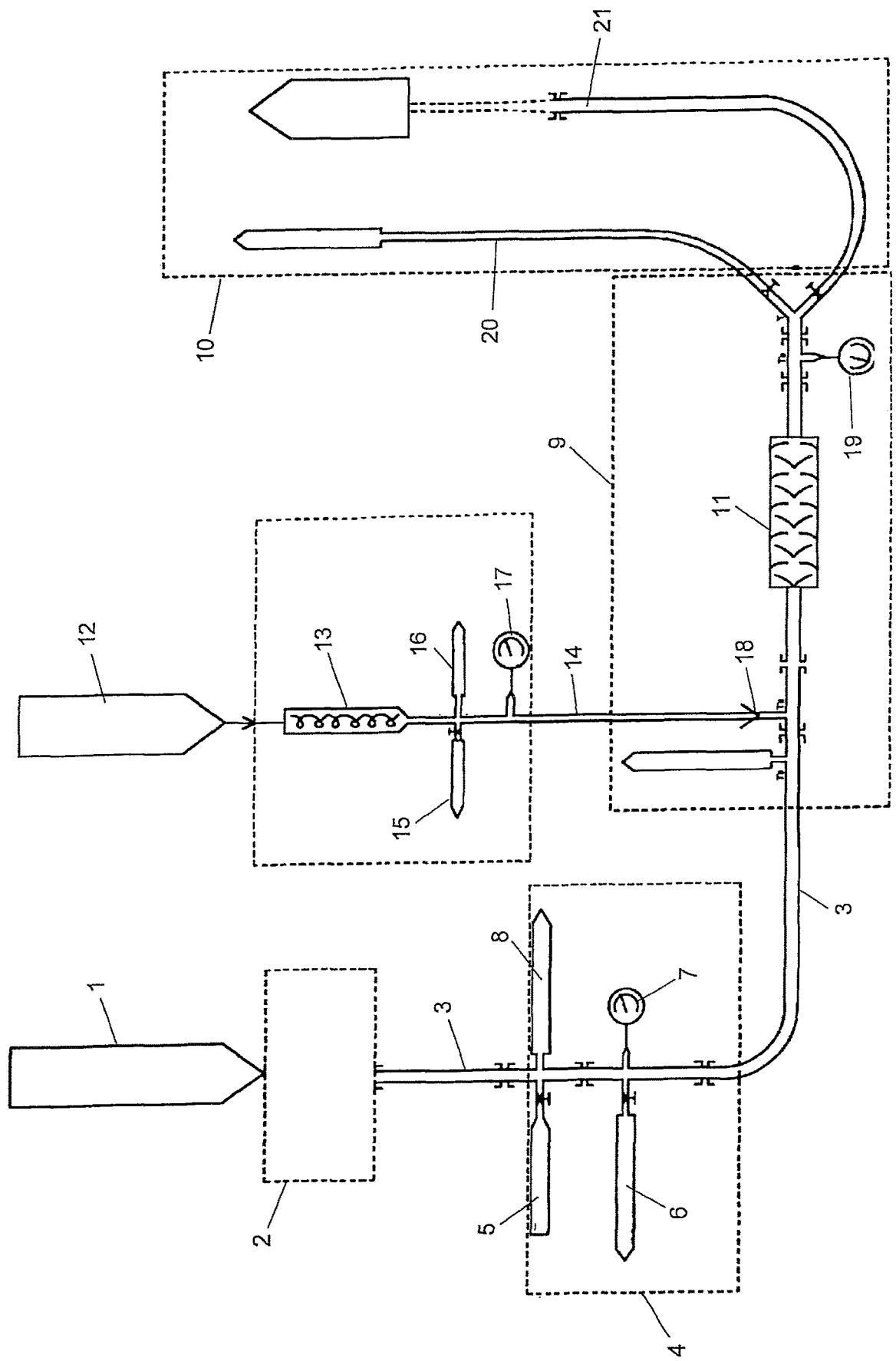

ONLINE CONTROL OF RHEOLOGY OF BUILDING MATERIAL FOR 3D PRINTING

CROSS-REFERENCE TO RELATED APPLICATIONS

This application is the U.S. National Stage of International Application Serial No. PCT/IB2017/000672, filed Jun. 2, 2017, which in turn claims priority to European Application No. 16 290 112.8, filed Jun. 22, 2016. The contents of all of these applications are incorporated herein by reference in their entirety.

The invention refers to a method of placing a flowable construction material comprising a hydraulic binder for building structural components layer-by-layer, such as for 3D concrete or mortar printing.

3D printing is a building technique that is commonly called "additive manufacturing" and consists of joining material to produce objects, layer upon layer, from 3D model data or other electronic data source. In particular, successive layers of material are formed under computer control by means of an industrial robot. It has already been proposed to develop 3D printers capable of producing structural buildings from a construction material that can be a mortar or a concrete. According to these proposals, the construction material is extruded through a nozzle to build structural components layer-by-layer without the use of formwork or any subsequent vibration. The possibility to build structures without formwork is a major advantage in terms of production rate, architectural freedom and cost reduction.

Usually, 3D printing of construction materials is a continuous process that comprises conveying fresh concrete or mortar to a deposition head and placing the construction material through an outlet of the deposition head in order to form a layer of concrete. While placing the concrete or the mortar, the deposition head is moved under computer control in order to create a layer of construction material in accordance with the underlying 3D model. In particular, the deposition head places a ribbon of fresh concrete or mortar material. For allowing the fresh concrete or mortar to be moved smoothly through each part of the delivery process to the deposition head, a consistent rheology of the fresh material must be safeguarded.

However, the construction material must not only be sufficiently fluid for conveying and extrusion purposes, but also sufficiently firm in order to provide the required mechanical stability of the 3D printed structure before the hydraulic binder sets. In particular, the lower layers of the construction material should sustain the load imposed by upper layers without collapsing. The person skilled in the art would therefore tend towards monitoring the material hardening and setting over time. The material must set early enough and harden sufficiently to sustain the weight of the subsequently placed layers. However, hardening of the material typically requires a prolonged time, which does not only result in a prolonged production time, but also in a decrease of the bonding strength between the layers. In order to enhance the bonding strength between the layers, it would be beneficial to place a layer while the preceding layer is still fresh. This in turn has the drawback, that a layer of freshly placed concrete does not have an adequate mechanical strength capable of sustaining the weight of the subsequently placed layers.

Therefore, the instant invention aims at improving a 3D printing process of the initially defined kind so as to overcome the above mentioned problems. In particular, the invention aims at providing a specific hydraulic composition and a method that allows a fast construction progress with short time gaps between the placement of successive layers of construction material and that at the same time provides sufficient mechanical strength of the layers capable of sustaining the weight of the subsequently placed layers.

In order to solve this object, the method according to the invention comprises:
- conveying the flowable construction material to a deposition head,
- placing the construction material through an outlet of the deposition head in order to form a layer of construction material,
- before placing the construction material, adding a rheology-modifying agent to the construction material so that the placed material has an increased yield stress when compared to the material during the conveying step.

Thus, the invention is based on the concept that the ability of the placed layers to sustain its own weight is linked to its rheology and more particularly to its yield stress. During the layer-by-layer building of a structure, the first placed layer undergoes the heaviest load. In order to ensure the structural stability during the process, the yield stress must be sufficient to sustain this load. By adding a rheology-modifying agent to the fluid construction material only shortly before the placement of the material, the construction material retains its ability to flow under relatively low shearing stress in its fresh state to the deposition head, but receives a sufficiently high yield stress when being placed so as to prevent the material from collapsing under its own weight or the weight of the next layers. Therefore, the inventive method combines two seemingly opposite characteristics: the construction material is easy to pump and has an increased yield stress once the material is placed.

The construction material may be a mortar, i.e. a mixture of a hydraulic binder, potentially additional mineral components such as ground limestone, water, sand, and chemical admixtures.

The construction material may also be a concrete, i.e. a mixture of a hydraulic binder, potentially additional mineral components such as ground limestone, water, sand, gravel, and chemical admixtures.

In a preferred embodiment, the construction material is a flowable ultrahigh performance concrete, i.e. a mixture of cement, fine limestone material, micro-sand and/or sand, a high-range water reducing admixture, potentially an accelerating admixture, and water, that develops a compressive strength at 28 days of at least 100 MPa.

The rheology-modifying agent may be added to the construction material just before reaching the deposition head or in the deposition head.

Preferably, the rheology-modifying agent and the construction material are mixed with each other before placing the construction material, wherein a static mixer is preferably used for mixing.

Preferably, the rheology-modifying agent is continuously added to the flow of conveyed construction material so that a continuous process is achieved. Preferably, not only the addition of the rheology-modifying agent, but also the mixing of the rheology-modifying agent with the flow of conveyed construction material is carried out continuously, so that a continuous deposition of the mix of construction material and rheology-modifying agent may be achieved while moving the deposition head in accordance with the underlying 3D data.

The amount of rheology-modifying agent that is continuously added to the flow of construction material per time unit is preferably controlled in order to adjust a defined ratio of rheology-modifying agent and construction material in the final mixture that is placed layer by layer. In particular, the flow rate of the construction material that is conveyed to the deposition head is measured and the flow rate of the rheology-modifying agent added to the flow of construction material is adjusted to achieve the defined ratio. Alternatively, a fixed flow rate of the construction material conveyed to the deposition head is adjusted and the flow rate of the rheology-modifying agent added to the flow of construction material is selected so as to achieve the defined ratio.

Preferably, the step of placing the construction material comprises extruding the construction material in a pasty form through a nozzle of the deposition head.

The amount of rheology-modifying agent added to the construction material is preferably selected such that a layer of placed material has a sufficient stability in order not to collapse under its own weight or the weight of subsequent layer(s) placed on top. In this connection, a preferred mode of operation consists in that, after the placement of a first layer of construction material, at least one subsequent layer of construction material is placed onto the first layer, wherein the amount of rheology-modifying agent added to the construction material is selected so as to increase the yield stress so that the first layer does not collapse under the load of said at least one subsequent layer.

In this connection, "not collapsing" means that the height of the layer is not reduced by more than 10%, preferably more than 5%, under the load of the at least one subsequent layer.

Since the inventive method aims at enabling a fast construction progress, the above stability criteria should preferably be fulfilled at a minimum construction speed as defined by a maximum time gap between the placement of two subsequent layers of material. According to a preferred mode of operation, construction material of the first layer is allowed to rest during a time period of not more than 2 minutes, preferably during a time period of 30-60 sec, before construction material of a subsequent layer is placed onto the said construction material of the first layer.

According to a preferred embodiment of the invention, the yield stress of the freshly placed construction material is 600-4000 Pa. Therefore, it is preferably proceeded such that the amount of rheology-modifying agent added to the construction material is selected so as to increase the yield stress to 600-4000 Pa. The yield stress is measured with a scissometer. A scissometer consists of a vane plunged into the material to be tested and to which an increasing torque is applied. When a failure occurs in the material, the vane starts to rotate, generally as the torque reaches its maximum value, which is considered as the characteristic value that is representative of the yield stress of the material. The yield stress measurement is preferably carried out within 30-60 sec after the material has been placed.

The addition of a rheology-modifying agent according to the invention results in that the increased yield stress property is attained almost instantly after placement, that is to say before the setting has occurred. Therefore, the increase in yield stress that is achieved by the invention is independent from the setting process of the hydraulic binder of the construction material. Thus, the invention generally does without controlling or accelerating the setting process.

However, in a preferred embodiment of the invention, even better results may be achieved by additionally accelerating the setting process. This allows to further increase the construction speed. In particular, a setting or hardening accelerator salt, such as, e.g., sodium chloride, calcium chloride, aluminum hydroxide, aluminum-potassium sulfate, sodium silicate, calcium nitrate and/or calcium nitrite, sodium and/or calcium thiocyanate, is preferably added to the hydraulic binder before, during and/or after the conveying step. An accelerating admixture may also be used that function both as setting accelerator and as rheology-modifying agent. Aluminum-potassium sulfate and sodium silicate may be mentioned as examples of admixtures that provide both functions.

A commercial accelerator typically used for shotcrete applications may also be used, such as Sika 40 AF, or CHRYSO®Jet products, at dosages comprised between 1.0 and 10%, more preferentially between 3.0% and 7% of the total weight of hydraulic binder.

The rheology-modifying agent may be any admixture that increases the yield stress of the placed material before setting of the hydraulic binder occurs. Preferably, a thickening agent or a viscosity enhancer is used as said rheology-modifying agent. This agent is preferentially used in liquid form. In particular, starch ether, cellulose ether and/or welan gum is used as the rheology-modifying agent or as a component of the rheology-modifying agent. Particularly good results have been achieved with the following admixtures: Foxcrete 5200 (starch ether) provided by Avebe, Aquasorb 2611 (water soluble polyacrylamide) provided by SNF Floerger SAS, Tylose MHS 300000 P6 (water soluble, non-ionic, highly etherified methyl hydroxyethyl cellulose) provided by SE Tylose GmbH & Co. KG, KelcoCrete (diutan gum) provided by CP Kelco and casein.

The conveying step of the inventive method comprises conveying the construction material in a flowable state to the deposition head. In particular, the conveying of the construction material is performed by pumping. Preferably, the material is conveyed in a wet state and is ready to be placed without the need of adding any additional components with the exception of the rheology-modifying agent.

Preferably the fresh construction material, such as fresh concrete or fresh mortar, is stored in a silo or any other storage container or in a mixer of a ready-mix delivery truck and is conveyed from the storage site directly to the deposition head.

Preferably, the construction material during the conveying step, i.e. before the addition of the rheology-modifying agent, is designed to be self-levelling. In particular, the yield stress of the material to be conveyed is between 200 to 400 Pa when measured with a scissometer.

In order to achieve the conveyability or pumpability described above, a water reducer, in particular a plasticizer or a super-plasticizer, preferably a plasticizer based on polyoxy polycarboxylate or phosphonates, is preferably added to the construction material before the conveying step.

A water reducer makes it possible to reduce the amount of mixing water for a given workability by typically 10-15%. By way of example of water reducers, mention may be made of lignosulphonates, hydroxycarboxylic acids, carbohydrates, and other specific organic compounds, for example glycerol, polyvinyl alcohol, sodium alumino-methyl-siliconate and sulfanilic acid as described in the Concrete Admixtures Handbook, Properties Science and Technology, V.S. Ramachandran, Noyes Publications, 1984.

Super-plasticisers belong to a new class of water reducers and are capable of reducing water contents of mixing water, for a given workability, by approximately 30% by mass. By way of example of a super-plasticiser, the PCP super-plasticisers may be noted. The term "PCP" or "polyoxy polycarboxylate" is to be understood according to the present invention as a copolymer of acrylic acids or methacrylic acids and their esters of polyoxy ethylene (POE).

Good results have been achieved with the following types of superplasticizers: CHRYSO®Premia, a PCP based high range water reducer, BASF MasterGlenium 27, a PCP based high range water reducer, and CHRYSO®Optima 100, a phosphonate based high range water reducer.

Preferably, the construction material comprises 0.05 to 1%, more preferably 0.05 to 0.5% of a water reducer, a plasticiser or a super-plasticiser, percentage expressed by mass relative to the dry cement mass.

In order to reduce and control the amount of entrained air in the mortar, a defoaming agent may be added. Uncontrolled higher levels of air in the mortar or concrete would reduce the mechanical strength at all ages, and increase in an uncontrolled manner the rheology of the fresh construction material.

A defoamer may for example be selected from the group consisting of mineral oils, organic polymers, surfactants and mineral mixtures, polyether siloxane and fume silica mixtures, polydimethylsiloxane and their mixtures.

Good results have been achieved with Dehydran 1922. This defoaming agent produced by BASF is a mixture of surfactants and minerals. Preferably, the construction material comprises 0.1-0.3 wt % of this additive.

The construction material used in the inventive method is a material based on a hydraulic binder, i.e. any material which produces strength-forming phases by solidifying and curing in contact with water, such as mortar or concrete. The hydraulic binder preferably comprises or is comprised of ordinary or white Portland cement. Portland cement as used in the invention may be any type of Portland cement. Suitable cements are the cements described in the European NF EN 197-1 Standard of April 2012 or mixtures thereof, preferably cement of the types CEM I, CEM II, CEM III, CEM IV or CEM V.

Good results have been achieved when using the white cement CEM I 52.5N produced at the cement plant of Le Teil, or the HTS cement produced at the cement plant of Le Teil.

Various mineral additions, such as, e.g., granulated blast-furnace slag (gbfs), fly ash, natural pozzolans, calcined clays or ground limestone, may be added to Portland cement, in order to obtain Portland composite cements. The mineral additions, typically between 10 and 50 wt.-% of the total binder weight, are in most applications ground granulated blast furnace slag, fly ash, pozzolans, ground limestone or mixtures thereof.

The water/binder ratio (wt/wt ratio) of the construction material used in the invention is preferably from 0.25 to 0.5, more preferably from 0.3 to 0.4. The water/binder ratio may vary, for example due to the water demand of the mineral additions when these are used. The water/binder ratio is defined as being the ratio by mass of the quantity of water to the dry mass of the hydraulic binder (Portland cement and mineral additions).

In a preferred embodiment the construction material is a self-levelling mortar made from sand, Portland cement, limestone filler and super-plasticizer.

The invention will now be described in more detail by reference to the following example and to an exemplary embodiment of an equipment shown in FIG. 1, which is suitable for carrying out the method of the invention.

EXAMPLE 1

A mortar was prepared having the following composition:
2058.6 g of NAG3 Ductal premix
11.33 g of CHRYSO®Optima 100
201.7 g of water This mortar has a slump flow of 140 mm measured according to the flow table method (ASTM C230). As the fresh mortar is self compacting, its yield stress is low and below 400 Pa.

The material was pumped at a flow rate of between 0.7 and 1.3 L/min. In the deposition head of a robot, an amount of Sika 40 AF was mixed with the mortar at a dosage of between 21 and 36 g/L of mortar.

The yield stress measured with a scissometer of the placed material was estimated between 800 and 1200 Pa.

Successive layers of the material were placed on top of each other, for a total height of approximately 1 meter, on a duration of 2 hours.

It was observed that the layers did not collapse, and the intended shape of the printed object was fully respected.

The layers were allowed to set and harden for 24 hours before the printed element could be manipulated.

EXAMPLE 2

A mortar was prepared having the following composition:
569.3 g of white cement CEM I 52.5N Le Teil
350.1 g of limestone filler BL 200 from Omya
1004.8 g of sand Sablon 0/0.315 from Sibelco
11.16 g of Glenium 27 from BASF
270.0 g of water This mortar has a slump flow of 210 mm measured according to the flow table Marsh Cone method (ASTM C230). As the fresh mortar is self compacting, its yield stress is low and below 400 Pa.

This formulation was tested on pumping system, without any robotic deposition device.

The material was pumped at a flow rate of 1.9 L/min. In the extrusion head, Foxcrete 5200 was added at a dosage of 0.4 g/L of mortar.

The yield stress of the placed material was measured at 2500 Pa.

The material was self-sustaining after the extrusion step. Up to 4 layers were put one atop another manually after 20 min, and the layers did not collapse.

FIG. 1 shows an equipment that is suitable for carrying out the method of the invention. In FIG. 1 self-leveling mortar 1 is supplied from a storage facility or from an on-site batching plant. The mortar is conveyed to a mortar pump 2, which conveys the mortar through a pipe 3. The pipe 3 leads through a security zone 4, which comprises various connections to the pipe 3. A first connection serves to connect a rinsing water source 5 to the pipe 3 in order to clean the piping of the conveying system from time to time. Further, an emergency outlet 6 is connected to the pipe 3 for removing mortar in case of occurrence of overpressure in the pipe 3. The pressure in pipe 3 is measured by means of a pressure gauge 7. Further, a rupture disc 8 is provided, which may be designed as a non-reclosing pressure relief device that protects the pipe 3 from overpressurization.

After leaving the security zone 4 the pipe 3 leads to a robot 9, which comprises a deposition head 10. The robot 9 comprises a drive unit (not shown) that moves the deposition head 10 along a path that is determined by an electronic control module based on 3D model data for the object to be constructed. The robot 9 comprises a static mixer 11 to which the mortar is conveyed through the pipe 3. The mixer 11 serves to mix the mortar with a rheology-modifying agent that is fed to the robot 9 from a storage tank 12. The rheology-modifying agent is supplied to a pump 13, which conveys the agent through a pipe 14 to the robot 9. The pipe 14 comprises several connections that are arranged downstream of the pump 13, namely one connection for an emergency outlet 15, one connection for a rupture disc 16 and one connection for a pressure gauge 17.

The pipe 14 leads into the pipe 3 with an check valve 18 being interposed. The pressure after the mixer 11 is measured by means of a pressure gauge 19. The mixture exiting the mixer 11 may either be fed to a pipe 20 that serves to discharge a waste portion of the mixture or to a pipe 21 which leads to the deposition head for extruding the mixture through a nozzle.

The invention claimed is:

1. A method of placing a flowable construction material comprising a hydraulic binder for building structural components layer-by-layer for 3D concrete printing, said method comprising:
   conveying the flowable construction material to a deposition head, wherein during said conveying the flowable construction material is conveyed through a pipe in communication with the deposition head and wherein, during at least part of said conveying, the flowable construction material has a first yield stress;
   placing the construction material through an outlet of the deposition head and moving the deposition head in order to form a layer of construction material,
   before placing the construction material through said outlet and after conveying the flowable construction material that has the first yield stress through at least part of said pipe, adding a rheology-modifying agent to the flowable construction material that has the first yield stress and that has been conveyed through at least part of said pipe so as to increase the yield stress of the flowable construction material from the first yield stress to a second yield stress that is greater than the first yield stress so that the placed material has an increased yield stress before setting occurs when compared to the material during the conveying step,
   wherein the placing of the construction material comprises extruding the construction material in a pasty form through a nozzle of the deposition head, and
   wherein successive layers of the construction material are placed on top of each other.

2. The method according to claim 1, wherein, after the placement of a first layer of construction material, at least one subsequent layer of construction material is placed onto the first layer, wherein the amount of rheology-modifying agent added to the construction material is selected so as to increase the yield stress so that the first layer does not collapse under the load of said at least one subsequent layer.

3. The method according to claim 1, wherein the yield stress of the freshly placed construction material is 600-4,000 Pa.

4. The method according to claim 1, wherein the construction material of a first layer of the successive layers is allowed to rest during a time period of not more than 2 minutes, before the construction material of a subsequent layer is placed onto said construction material of the first layer of the successive layers.

5. The method according to claim 1, wherein the rheology-modifying agent is continuously added to the flow of conveyed construction material.

6. The method according to claim 1, wherein the rheology-modifying agent and the construction material are mixed with each other before said placing of the construction material.

7. The method according to claim 1, wherein a water reducer is added to the hydraulic binder before the conveying step, wherein the conveying of the construction material is performed by pumping.

8. The method according to claim 1, wherein a setting accelerator is added to the hydraulic binder before the conveying step.

9. The method according to claim 1, wherein a thickening agent or a viscosity enhancer is used as said rheology-modifying agent.

10. The method according to claim 1, wherein starch ether, celluloses ether, water soluble polyacrylamide, casein, and/or welan gum is used as or in the rheology-modifying agent.

11. The method according to claim 1, wherein the construction material is concrete or a cement mortar.

12. The method according to claim 1, wherein the construction material is a ultrahigh performance concrete.

13. The method according to claim 4, wherein the time period is 30-60 sec.

14. The method according to claim 6, wherein a static mixer is used for mixing.

15. The method according to claim 7, wherein the water reducer is a plasticizer or a super-plasticizer.

16. The method according to claim 15, wherein the water reducer is a plasticizer based on polyoxy polycarboxylate or phosphonates.

17. The method according to claim 8, wherein the setting accelerator is sodium chloride, calcium chloride, aluminum hydroxide, aluminum-potassium sulfate, sodium silicate, calcium nitrate and/or calcium nitrite, sodium and/or calcium thiocyanate.

18. The method according to claim 1, wherein adding a rheology-modifying agent to the flowable construction material comprises conveying the rheology-modifying agent through a another pipe, wherein said pipe and said other pipe are connected to a robot in which the flowable construction material that has the first yield stress is mixed with the rheology-modifying agent to produce the flowable construction material that has the second yield stress.

19. The method according to claim 18, further comprising supplying by said robot the flowable construction material that has the second yield stress to said deposition head.

20. The method according to claim 19, wherein said deposition head is movable by said robot.

21. The method according to claim 1, wherein the rheology-modifying agent is added to the flowable construction material in said pipe such that the flowable construction material that has the first yield stress is conveyed through said at least part of said pipe and the flowable construction material that has the second yield stress is conveyed through another part of the pipe prior to be being discharged through the outlet of the deposition head.

22. The method according to claim 1, wherein the rheology-modifying agent is added to the flowable construction material after conveying the flowable construction material that has the first yield stress through said at least part of said pipe and upstream of a mixing chamber such that the flowable construction material with said rheology-modifying agent flows into the mixing chamber and are mixed in said mixing chamber to produce said flowable construction material having said second yield stress prior to discharging said flowable construction material having said second yield stress through the outlet of the deposition head.

* * * * *